(12) United States Patent
Yuhara et al.

(10) Patent No.: US 10,279,542 B2
(45) Date of Patent: May 7, 2019

(54) ULTRASONIC SEALING ANVIL

(71) Applicant: TOPPAN PRINTING CO., LTD., Tokyo (JP)

(72) Inventors: Noritaka Yuhara, Tokyo (JP); Yo Akiba, Tokyo (JP); Yasuhiko Kimura, Tokyo (JP); Junichi Yamamoto, Tokyo (JP)

(73) Assignee: TOPPAN PRNTING CO., LTD., Tokyo (JP)

( * ) Notice: Subject to any disclaimer, the term of this patent is extended or adjusted under 35 U.S.C. 154(b) by 0 days.

(21) Appl. No.: 15/906,097

(22) Filed: Feb. 27, 2018

(65) Prior Publication Data

US 2018/0186087 A1 Jul. 5, 2018

Related U.S. Application Data

(63) Continuation of application No. PCT/JP2016/072219, filed on Jul. 28, 2016.

(30) Foreign Application Priority Data

Aug. 31, 2015 (JP) ................................. 2015-171185

(51) Int. Cl.
B32B 37/00 (2006.01)
B29C 65/00 (2006.01)
B65B 51/22 (2006.01)
B29C 65/08 (2006.01)
(Continued)

(52) U.S. Cl.
CPC .......... *B29C 66/8145* (2013.01); *B29C 65/08* (2013.01); *B29C 65/7451* (2013.01); *B29C 66/1122* (2013.01); *B29C 66/346* (2013.01); *B29C 66/4312* (2013.01); *B29C 66/72328* (2013.01); *B29C 66/7373* (2013.01); *B29C 66/73921* (2013.01); *B29C 66/81431* (2013.01); *B29C 66/8322* (2013.01); *B29C 66/8491* (2013.01); *B65B 51/22* (2013.01); *B65B 51/225* (2013.01); *B29C 66/81419* (2013.01);
(Continued)

(58) Field of Classification Search
USPC ....................................... 156/580.2
See application file for complete search history.

(56) References Cited

FOREIGN PATENT DOCUMENTS

EP        1241098 A1 * 9/2002
JP        H11-43119 A    2/1999
(Continued)

OTHER PUBLICATIONS

International Search Report with English translation and Written Opinion issued in International Application No. PCT/JP2016/072219 dated Oct. 25, 2016.

*Primary Examiner* — James D Sells
(74) *Attorney, Agent, or Firm* — Foley & Lardner LLP

(57) ABSTRACT

An ultrasonic sealing anvil is provided which is capable of applying an optimal pressure to an overlap part in the absence of misalignment between the overlap part and the anvil, and preventing application of an excessive pressure in the occurrence of misalignment. An ultrasonic sealing anvil is configured to seal a tubular material having an overlap part extending in one direction, in a sealing direction crossing the overlap part. The anvil is provided with a step that can be abutted with the overlap part R, and a pair of grooves arranged sandwiching the step in the sealing direction.

6 Claims, 7 Drawing Sheets

(51) Int. Cl.
*B29C 65/74* (2006.01)
*B29L 31/00* (2006.01)

(52) U.S. Cl.
CPC ... *B29C 66/81423* (2013.01); *B29L 2031/712* (2013.01); *B29L 2031/7166* (2013.01)

(56) References Cited

FOREIGN PATENT DOCUMENTS

| | | |
|---|---|---|
| JP | 2001-018924 A | 1/2001 |
| JP | 2002-326294 A | 11/2002 |

\* cited by examiner

ULTRASONIC SEALING ANVIL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/072219, filed Jul. 28, 2016, which is based upon and claims the benefit of priority of Japanese Patent Application No. 2015-171185, filed Aug. 31, 2015, the entireties of which are hereby incorporated by reference.

TECHNICAL FIELD

The present invention relates to an ultrasonic sealing anvil of an ultrasonic sealing apparatus for sealing packaging materials.

BACKGROUND ART

Presently, liquids such as beverages are filled in paper packaging materials for sale. Packaging materials after storage of liquid are formed into various three-dimensional shapes, such as triangular pyramids, rectangular prisms, or tubular shapes. In the present specification, a packaging material after being formed is referred to as a "package".

When producing substantially rectangular prism packages, for example, among these types of packages, surfaces of a long packaging material are overlapped with each other, first, by overlapping the lateral opposite ends of the material with each other, and then bonded to each other for formation into a tubular shape. Then, the tubular packaging material is sealed at the lower end, and filled with contents, followed by sealing the upper end. The packaging material of which both ends have been sealed is pressed to form a three-dimensional rectangular prism. In the present specification, sealing of a packaging material is hereinafter referred to as "sealing".

Ultrasonic sealing may be used as a sealing method of packaging materials. When performing ultrasonic sealing, the sealing part of a packaging material is pressed while being sandwiched between a resonator referred to as a horn and a receiving jig referred to as an anvil. Ultrasonic sealing provides vibrational energy to the sealing part via the horn simultaneously with application of pressure, and melts the thermoplastic resin on the inner surfaces of the packaging material to fuse them together. The packaging material of which both ends have been sealed is pressed to form a three-dimensional rectangular prism.

The sealing part of the packaging material includes a portion where the lateral ends of the packaging material are overlapped with each other. In the present specification, hereinafter, the portion where surfaces of the packaging material are overlapped with each other is referred to as "overlap part". The overlap part is thicker than the rest of the sealing part, and receives high pressure via the horn and the anvil. The anvil is provided with a recess, being aligned with the overlap part, to thereby press the sealing part with a uniform force. This type of configuration is described in, for example, PTL 1.

There is a trend of increasing the speed of ultrasonic sealing more and more, and at present, packages are manufactured at a rate of 100 to 400 packages per minute. Faster processing with ultrasonic sealing may accordingly impair the positioning accuracy between the recess of the anvil and the sealing part, causing misalignment of the overlap part with the anvil. In the occurrence of misalignment, excessive pressure is likely to be applied to the overlap part, causing poor sealing that leads to leakage of the contents.

PTL 2 describes an ultrasonic sealing apparatus including an anvil that is formed with continuous grooves in a portion used for sandwiching the sealing part, thereby preventing leakage of the contents due to misalignment of the overlap part. According to such an ultrasonic sealing apparatus, in spite of the overlap part being misaligned with the anvil, ridges defined between the grooves discontinuously press the overlap part.

CITATION LIST

[Patent Literature] PTL 1: JP H11-43115 A; PTL 2: JP 2002-326294 A SUMMARY OF THE INVENTION

Technical Problem

However, the configuration of discontinuously applying pressure to the overlap part reduces the pressure applied to the overlap part, regardless of the occurrence of misalignment. Therefore, an optimal pressure is unlikely to be applied to the overlap part even where there is no misalignment. Further, since this type of configuration presses the overlap part discontinuously, the area of the anvil abutting with the overlap part is small, and a relatively strong pressure is required for sealing. Therefore, the packaging material may be damaged by the large pressure applied via the grooves of the anvil, leading to possibly impairing the appearance of the packaging material, and furthermore, to potential leakage of the contents.

The present invention has been made taking the aforementioned points into consideration, and has an object to provide an ultrasonic sealing anvil capable of applying an optimal pressure to an overlap part in the absence of misalignment between the overlap part and the anvil, and preventing application of an excessive pressure to the overlap part in the occurrence of misalignment there between.

Solution to Problem

To solve the aforementioned problem, an ultrasonic sealing anvil according to an aspect of the present invention seals a packaging material having an overlap part extending in one direction, the sealing being performed in a sealing direction crossing the overlap part, characterized in that the anvil includes a step that can be abutted with the overlap part, and a groove arranged on both sides of the step in the sealing direction.

Advantageous Effects of the Invention

According to an aspect of the present invention, an ultrasonic sealing anvil is provided which is capable of applying a more optimal pressure to an overlap part in the absence of misalignment between the overlap part and the anvil, and better preventing application of an excessive pressure in the occurrence of misalignment.

BRIEF DESCRIPTIONS OF THE DRAWINGS

Figure 2:
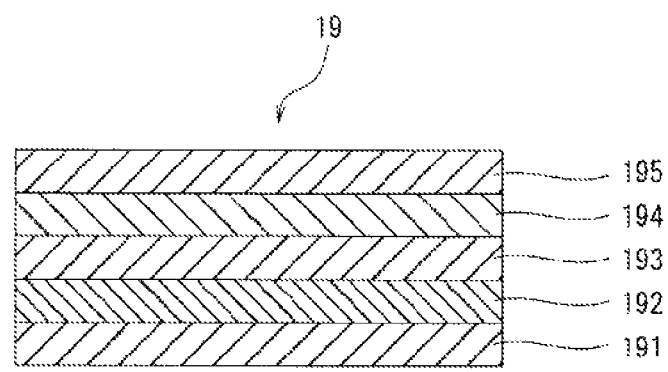
FIG. 2 is a diagram illustrating a packaging material processed by the ultrasonic sealing apparatus illustrated in FIG. 1.
Figure 3A:
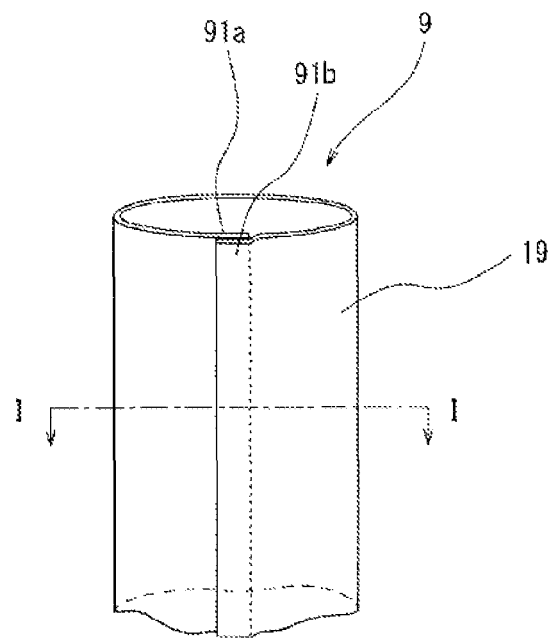
Figure 3B:
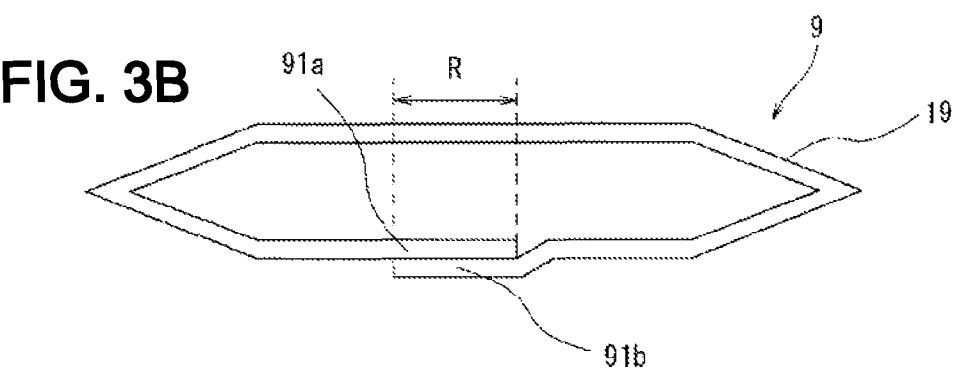
Figure 3C:
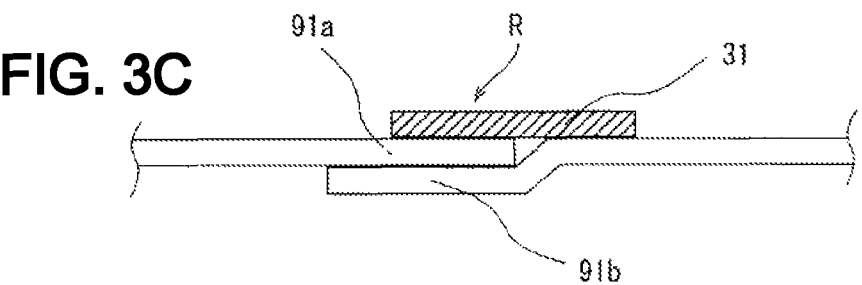

FIGS. 3(a) to 3(c) are diagrams each illustrating a tubular material formed of the packaging material illustrated in FIG. 2.

Figure 1:
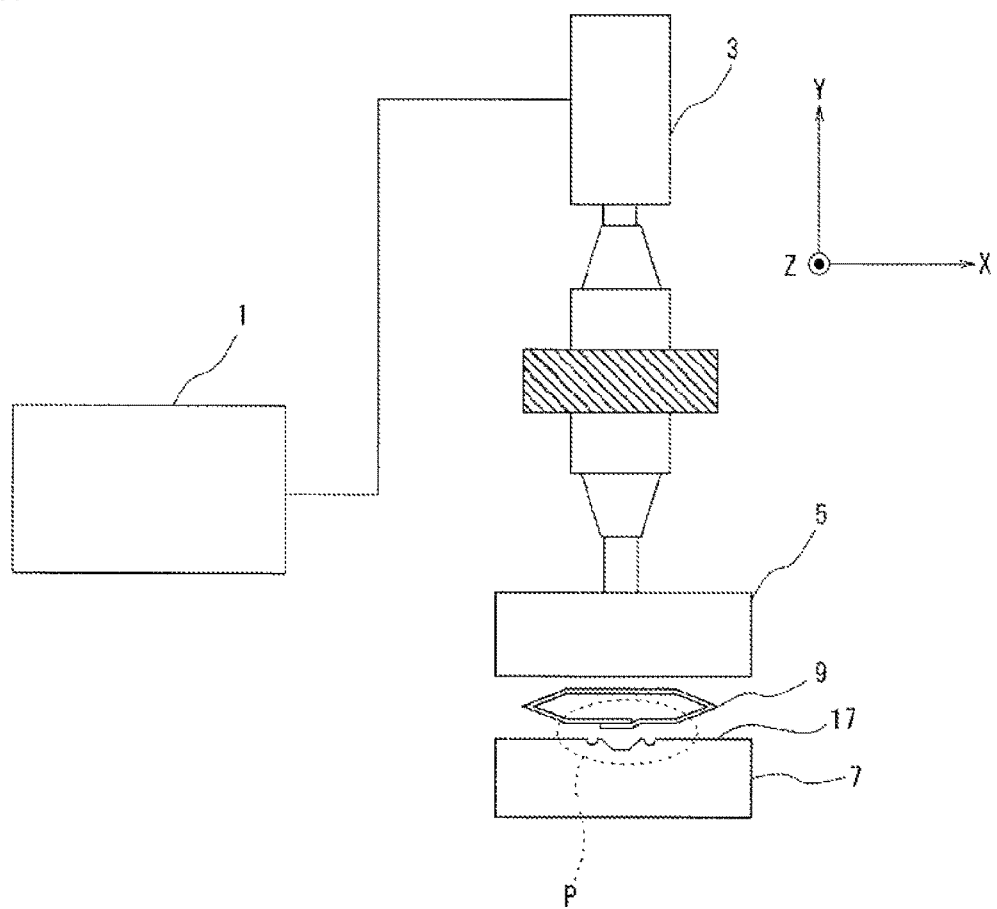
FIG. 1 is a schematic diagram illustrating an ultrasonic sealing apparatus according to an embodiment of the present invention.
Figure 4A:
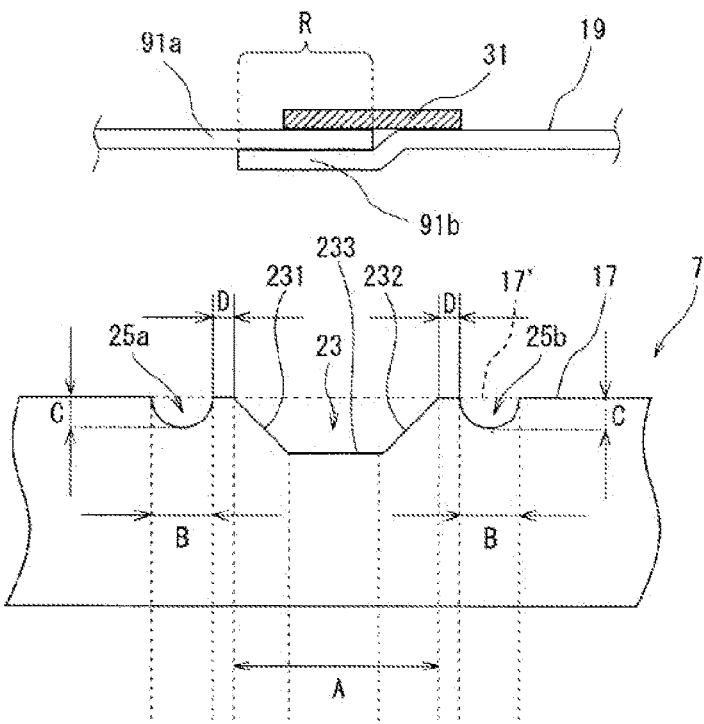
Figure 4B:
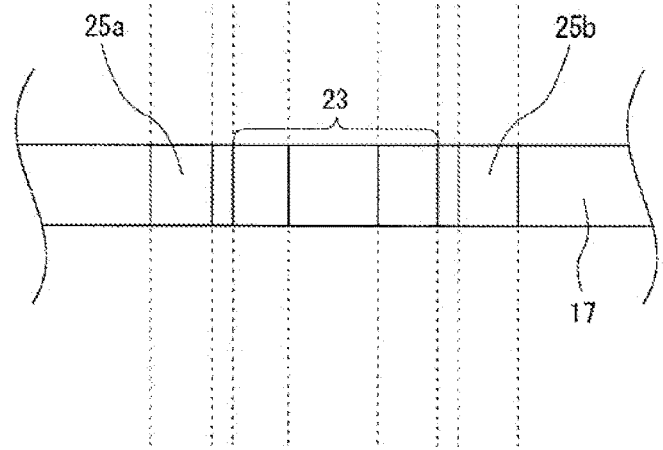

FIGS. 4(a) and 4(b) are diagrams each illustrating an enlarged part of FIG. 1.

Figure 5:
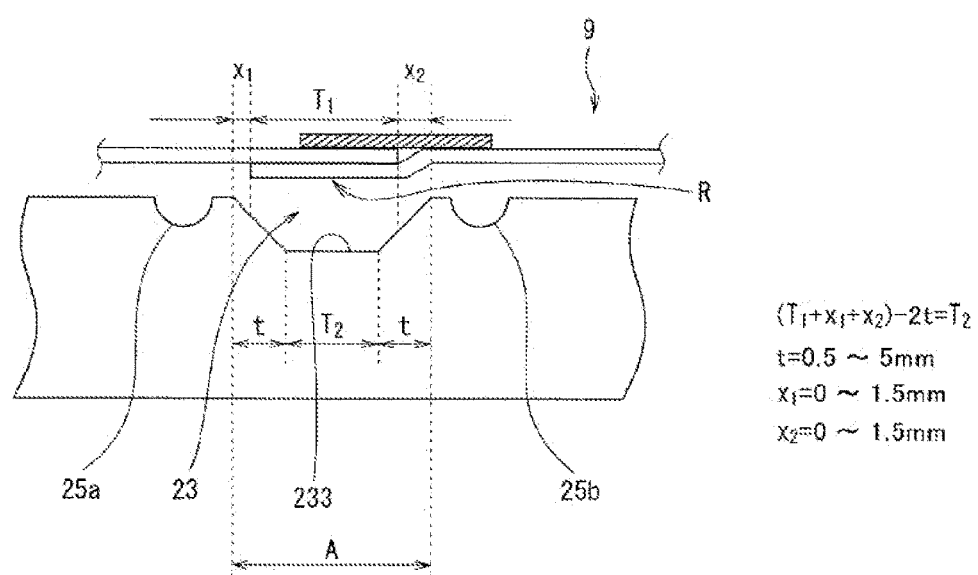

FIG. 5 is a diagram illustrating a relationship between the length of a step and an overlap part according to the embodiment of the present invention.

Figure 6A:
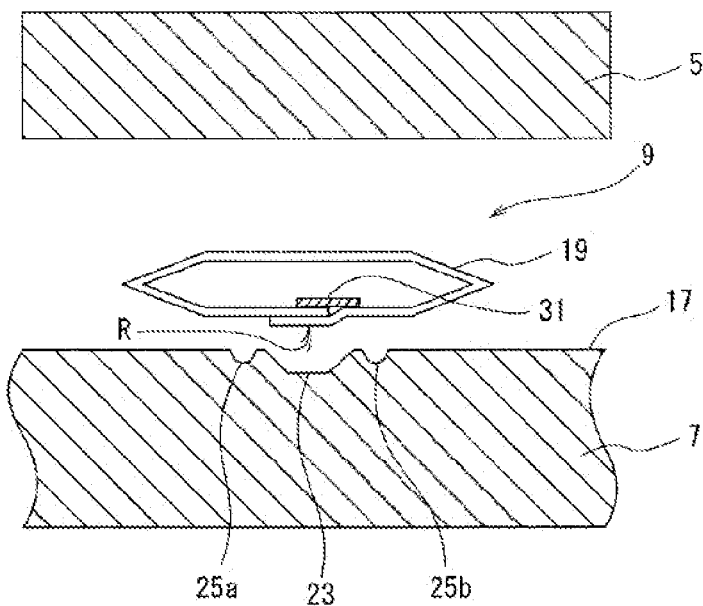
Figure 6B:
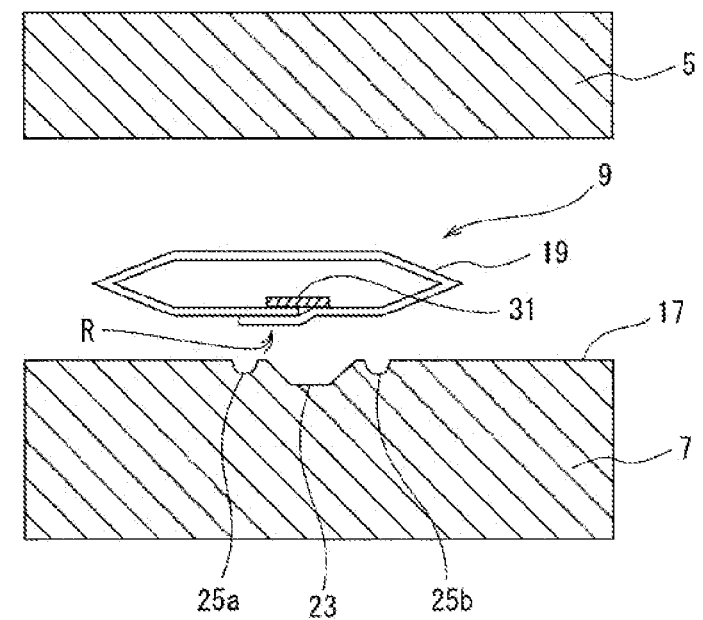

FIGS. 6(a) and 6(b) are diagrams illustrating advantageous effects according to the embodiment of the present invention.

Figure 7:
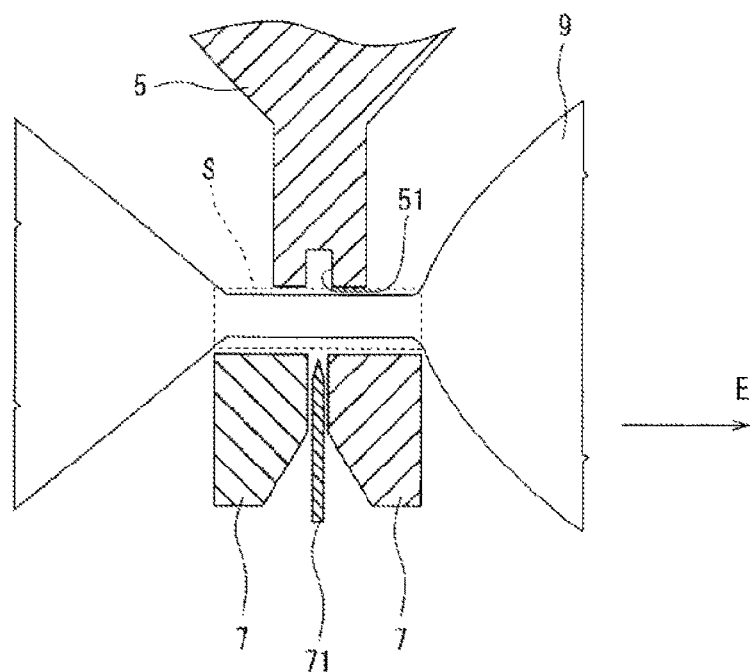

FIG. 7 is a diagram illustrating an operation of the ultrasonic sealing apparatus illustrated in FIG. 1.

Figure 8:
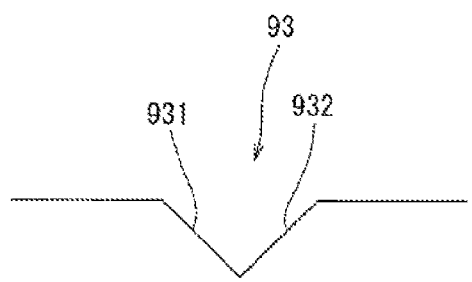

FIG. 8 is a diagram illustrating another example of the anvil according to the embodiment of the present invention.

DESCRIPTION OF THE REPRESENTATIVE EMBODIMENTS

An embodiment of the present invention will be described below. Also, variations should be evident to one of skill in the art. It is to be understood that the description below is intended to be representative of the present invention, and that the present invention is not necessarily limited to the description below.

The present embodiment describes an ultrasonic sealing anvil (hereinafter may be simply referred to as an "anvil") by way of an example of producing a package having an appearance of a substantially rectangular prism filled with a liquid. The package described in the present embodiment can store contents, for example, a liquid such as juice or an alcoholic beverage, or solid contents for a long period of time.

(Overall Configuration)

FIG. 1 is a schematic diagram illustrating an ultrasonic sealing apparatus that uses an anvil of the present embodiment. The ultrasonic sealing apparatus shown in FIG. 1 is provided with an ultrasonic oscillator 1, a converter 3, a horn 5 and an anvil 7. The horn 5 and the anvil 7 sandwich there between a tubular material 9 that is a packing material. As necessary, the positional relationship between the horn 5 and the anvil 7 is determined by a three-dimensional coordinate with X-axis, Y-axis, and Z-axis shown in FIG. 1.

The ultrasonic oscillator 1 supplies electric power to the converter 3 serving as an ultrasonic transducer. The electric power supplied by the ultrasonic oscillator 1 is converted into mechanical vibrations by the converter 3 and then supplied to the horn 5. The horn 5 cooperates with the anvil 7 to sandwich the tubular material 9 there between, and presses the tubular material 9 while applying vibrations thereto to seal the tubular material 9 in the X-axis direction of FIG. 1. In the present embodiment, the direction in which the tubular material 9 is sealed (X-axis direction of FIG. 1) is referred to as a "sealing direction", and the entirety of the sealed portion of the tubular material 9 is hereinafter referred to as the "sealing part".

(Tubular Material)

The tubular material 9 will be described below. FIG. 2 is a diagram illustrating a packaging material 19 serving as a material for the tubular material 9. The packaging material 19 has a multilayer structure of resins or papers. In the packaging material 19, the surface facing the inner side of the package that is filled with contents is referred to as the "inner surface", and the surface on the outer side of the package is referred to as the "surface". The packaging material 19 is formed by laminating a first polyethylene (hereinafter may be referred to as PE) resin 191, a barrier material 192, a second PE resin 193, a paper 194, and a third PE resin 195 in this order from the inner surface side.

The first PE resin 191 is a thermoplastic resin and acts as an adhesive when the inner surfaces of the packaging material 19 are welded to each other. The barrier material 192 that can be used may be polyethylene terephthalate (PET) formed with a vapor deposition film layer to impart barrier properties thereto, aluminum, or the like.

In FIG. 3, (a), (b) and (c) are diagrams each illustrating the tubular material 9. As shown in FIG. 3(a), the tubular material 9 is formed by overlapping lateral end parts 91a and 91b of a long packaging material 19. Therefore, the tubular material 9 is a long member.

FIG. 3(b) is a cross-sectional view of the tubular material 9 taken along the line I-I of FIG. 3(a).

As shown in FIG. 3(b), the region in which the end parts 91a and 91b overlap each other is referred to as an overlap part R in the present embodiment. The overlap part R extends in the longitudinal direction of the long tubular material 9.

As shown in FIG. 3(c), an edge protection tape 31 is adhered to an end portion of the end part 91a of the overlap part R. The edge protection tape 31 adheres the end part 91a to the inner surface of the packaging material 19 to form the packaging material 19 into the tubular material 9.

(Anvil)

FIG. 4(a) and FIG. 4(b) are enlarged diagrams illustrating the portion P indicated by the dashed line in FIG. 1. FIG. 4(a) is a cross-sectional view taken along the sealing direction of the anvil 7. FIG. 4(b) is a top view of the anvil 7 corresponding to FIG. 4(a). The anvil 7 seals the tubular material 9 in a direction (sealing direction) crossing the overlap part R. In the present embodiment, the sealing direction is taken to be the X-axis direction shown in FIG. 1.

As shown in FIG. 4(a) and FIG. 4(b), the anvil 7 of the present embodiment has a step 23 that abuts against the overlap part R, and a pair of grooves 25a and 25b respectively disposed on both sides of the step 23 to sandwich the step 23 in the sealing direction.

The step 23 and the groove 25a, 25b are processed into shape through a process of cutting the surface of the anvil 7. In the present embodiment, the surface of the anvil 7 where the step 23 and the groove 25a, 25b are not yet formed is referred to as a surface 17, and a virtual surface that is an extension of the surface 17 over the step 23 and the groove 25a, 25b (corresponding to the flat surface prior to forming the step 23 and the groove 25a, 25b) is referred to as a phantom surface 17'.

The step 23 of the present embodiment is formed at the position corresponding to the overlap part R to press the overlap part R. The step 23 is formed into a shape suitable for applying an optimal pressure to the thick overlap part R when the overlap part R abuts against the step 23 without any misalignment. If the overlap part R is misaligned relative to the step 23, the groove 25a, 25b has a role of mitigating the pressure applied to part of the overlap part R, the part abutting against a portion where there is no step 23.

The step 23 has side surfaces 231 and 232, and a bottom surface 233 parallel to the surface 17 and the phantom surface17'. The side surfaces 231 and 232 of the step are reversely tapered from the bottom surface 233 towards the surface 17, that is, tapered inwards with increasing depth from the surface 17 towards the bottom surface 233. Therefore, the length of the step 23 in the sealing direction is the longest at the level where the step 23 meets the phantom surface 17', and becomes smaller towards the bottom (bottom side). In the present embodiment, hereinafter, the maximum length of the step 23 is simply referred to as the "length of the step". In FIG. 4(a), a reference "A" is designated to the length of the step.

The reversely tapered side surfaces 231 and 232 of the step 23 can reduce the pressure change in the surface to be sealed even if the overlap part R in the step 23 is misaligned relative to A.

As shown in FIG. 4(a) and FIG. 4(b), the cross section of the groove 25a, 25b is in a curved shape, such as a semicircular shape. Further, the length of the groove 25a, 25b in the sealing direction is the longest at the level where the groove meets the phantom surface 17', and becomes smaller from the phantom surface 17' towards the bottom (bottom side). In the present embodiment, hereinafter, the maximum length of the groove 25a, 25b in the sealing direction is simply referred to as the "width of the groove". In FIG. 4(a) and FIG. 4(b), a reference "B" is designated to the width of the groove 25a, 25b.

In the present embodiment, the width B of the groove is in the range of about 0.5 mm or more to about 1.5 mm or less. The width B of the groove 25a, 25b falling within this range in the present embodiment can mitigate the pressure applied to the overlap part R if the groove 25a, 25b abuts with the overlap part R, and can apply a pressure, which is necessary for welding the packaging material 19, to the sealing part if the grooves abut with the sealing part other than the overlap part R.

In the groove 25a, 25b having a curved cross section, the depth becomes larger towards the center of the groove in the sealing direction. In the present embodiment, the maximum depth of the groove 25a, 25b is referred to as the "depth of the groove". In FIG. 4(a) and FIG. 4(b), a reference "C" is designated to the depth of the groove 25a, 25b.

In the present embodiment, the depth C of the groove 25a, 25b is in the range of 0.05 mm or more to 1 mm or less. The depth C of the groove 25a, 25b falling within this range in the present embodiment can mitigate the pressure applied to the overlap part R if the groove 25a, 25b abuts with the overlap part R, and can apply a pressure, which is necessary for welding the packaging material 19, to the tubular material 9 if the grooves abut with the sealing part other than the overlap part R.

The cross section of the groove 25a, 25b does not necessarily have to be a curved shape, but may be a triangular or square shape.

In the present embodiment, the step 23 is disposed being sandwiched by the pair of grooves 25a and 25b. Accordingly, the step 23 is adjacent to the groove 25a, 25b. The distance from the groove 25a, 25b to the adjacent step 23 falls within the range of 0 mm or more to 1.5 mm or less.

In the present embodiment, the distance between the groove 25a and the step 23 is referred to as the "distance between the groove and the step". This distance between the groove and the step is defined by an end of the groove 25a nearest the step 23 where the groove 25a meets the phantom surface 17', and an end of the adjacent step 23 nearest the groove 25a where the step 23 meets the phantom surface 17'. Similarly, the distance between the groove 25b and the step 23 is referred to as the "distance between the groove and the step". This distance between the groove and the step is defined by an end of the groove 25b nearest the step 23 where the groove 25b meets the phantom surface 17', and an end of the adjacent step 23 nearest the groove 25b where the step 23 meets the phantom surface 17'. In FIG. 4(a) and FIG. 4(b), a reference "D" is designated to the distance between the groove 25a and the step 23 and the distance between the groove 25b and the step 23.

In the present embodiment, the distance D between the groove 25a, 25b and the step 23 falls within the range of 0 mm or more to 1.5 mm or less. In the present embodiment, when the distance between the groove 25a, 25b and the adjacent step 23 is 0 mm, it means that the groove 25a, 25b and the step 23 are in contact with each other in plan view.

In the present embodiment, the distance D between the groove 25a, 25b and the step 23 falling within this range allows the first PE resin 191 melted in the overlap part R to reach the groove 25a, 25b, and allows surfaces of the packaging materials 19 to appropriately fuse together in the groove 25a, 25b.

In the present embodiment, the shape of the cross section of the groove 25a, 25b in the sealing direction is different from the shape of the cross section of the step 23 in the sealing direction of the tubular material. In the present embodiment, the shape of the cross section of the groove 25a, 25b in the sealing direction is referred to as the "cross-sectional shape of the groove", and the cross-sectional shape of the step 23 in the sealing direction is referred to as the "cross-sectional shape of the step".

The cross-sectional shape of the groove 25a, 25b is independently formed without depending upon the cross-sectional shape of the step 23. The step 23 is formed so as to apply an optimal pressure to the overlap part R when the overlap part R abuts with the step 23 without any misalignment. The groove 25a, 25b is formed so as to mitigate the pressure applied to the overlap part R if the groove 25a, 25b abuts with the overlap part R, and apply a pressure, which is necessary for sealing the packaging material 19, to the sealing part if the groove abuts with the sealing part other than the overlap part R.

Thus, the step 23 and the groove 25a, 25b are each formed into an optimum shape according to the respective purposes.

FIG. 5 is a diagram illustrating a relationship between the length A of the step 23 and the overlap part R of the tubular material 9. As shown in FIG. 5, the length A of the step 23 is expressed by the following Formulas (1) and (2). In Formula (1), $T_1$ is the length of the overlap part R in the sealing direction. In Formula (2), $T_2$ is the length of the bottom surface 233 in the sealing direction. In Formulas (1) and (2), $x_1$ is the length of the deviation in the sealing direction between an end of the step 23 in the sealing direction and the overlap part R, in a state where the step 23 is pressed against the overlap part R. $x_2$ is the length of the deviation in the sealing direction between the other end of the step 23 in the sealing direction and the overlap part R, in a state where the step 23 is pressed against the overlap part R. In the present embodiment, the lengths $x_1$ and $x_2$ refer to a "misalignment amount between the step and the overlap part".

In the formulas, t is the length of the phantom surface 17' shown in FIG. 4(a) extending in the sealing direction from an end of the step 23 to an end of the bottom surface 233 nearest to this end of the step 23. In the present embodiment, t refers to the "length in the sealing direction from an end of the step to an end of the bottom surface".

$$A = T_1 + x_1 + x_2 \quad \text{Formula (1)}$$

$$A = 2t + T_2 \quad \text{Formula (2)}$$

From Formulas (1) and (2), it is understood that the lengths $T_1$ and $T_2$ establish a relationship there between expressed by Formula (3).

$$T_2 = T_1 + x_1 + x_2 - 2t \qquad \text{Formula (3)}$$

In the relationship set forth above, t is set to be in the range of 0.5 mm or more to 5 mm or less in the present embodiment. The step 23 is formed with $x_1$ and $x_2$ being in the range of 0 or more to about 1.5 mm or less.

In the present embodiment, the "step" is a recess whose length A is not less than the length $T_1$, and thus is distinguished from the "groove" that is a recess whose width B is smaller than the length $T_1$.

FIG. 6(a) and FIG. 6(b) are diagrams illustrating the effects obtained by the anvil 7 of the present embodiment described above. FIG. 6(a) is a cross-sectional view illustrating the anvil 7 in the sealing direction in the absence of misalignment of the overlap part R. FIG. 6(b) is a cross-sectional view of the anvil 7 in the sealing direction in the occurrence of misalignment in the overlap part R.

As shown in FIG. 6(a), when the overlap part R accurately abuts against the step 23 without suffering misalignment, the overlap part R is bent and pressed into the step 23 by the horn 5. Therefore, in the present embodiment, a uniform pressure is applied to the surface 17 by the horn 5, while an optimal pressure is applied to the overlap part R having a different thickness than the rest of the sealing part.

Further, in the present embodiment, when the overlap part R accurately abuts with the step 23, the sealing part other than the overlap part R abuts with the groove 25a, 25b. In this case, the first PE resin 191 serving as the inner surface of the tubular material 9 is melted with the application of vibration. The melted first PE resin 191 is pressed and permitted to move to the position of the groove 25a, 25b to contribute to sealing the tubular material 9 abutting with the groove 25a, 25b.

In the present embodiment, the step 23 abutting with the entire overlap part R enables uniform application of pressure to the overlap part R. The configuration of the present embodiment can prevent damage to the packaging material 19 compared to the configuration which discontinuously presses the overlap part, and can reduce the probability of the contents leaking, without impairing the appearance of the package.

As shown in FIG. 6(b), the overlap part R is misaligned relative to the step 23, and part of the overlap part R abuts with the groove 25a, 25b. When the tubular material 9 is pressed by the horn 5, the groove 25a, 25b prevents application of excessive pressure to the overlap part R, while applying a sufficient pressure to the overlap part R for welding.

The occurrence of misalignment between the overlap part R and the step 23 cannot be predicted, as to whether it occurs on the right or left of the step 23. In view of this point, the present embodiment arranges a pair of grooves 25a and 25b sandwiching the step 23 in the sealing direction.

Further, since the present embodiment has a relatively simple configuration in which the groove 25a, 25b is provided on both sides of the step 23, the cost involved in the processing of the anvil 7 is comparatively low.

The following description addresses advantageous effects of the present embodiment exerted by limiting the ranges in the width B of the groove 25a, 25b, the depth C of the groove 25a, 25b, and the distance D between the groove 25a, 25b and the step 23.

TABLE 1

| Parameter | Numerical value (mm) | | | | |
|---|---|---|---|---|---|
| | Less than 0.5 | 0.7 | 1.0 | 1.2 | More than 1.5 |
| B | x | ○ | ○ | ○ | x |
| | Less than 0.05 | 0.05 | 0.1 | More than 1.0 | |
| C | x | ○ | ○ | ○ under conditions of 0.5 ≤ B ≤ 1.5 | x under the conditions of 0.5 > B 1.5 < B |
| | Less than 0 | 0.1 | 1.5 | More than 1.5 | |
| D | x | ○ | ○ | x | |

Table 1 shows ranges of the width B, depth C and distance D and sealing state. In Table 1, the mark "○" indicates a state where the contents of the package do not leak, and this state may be referred to as a "good sealing state". The mark "x" indicates a state where the contents of the package leaked, and this state may be referred to as a "poor sealing state".

According to Table 1, a poor sealing state is brought about in the case where the width B of the groove 25a, 25b is out of the range of about 0.5 mm or more to about 1.5 mm or less. Specifically, a width B of less than 0.5 mm coupled with misalignment between the overlap part R and the step 23 unavoidably causes application of an excessive pressure to the overlap part R. Also, a width B in excess of 1.5 mm increases the area to which the ultrasonic vibrations are not transmitted, and thus a good sealing state cannot be accomplished, leading to leakage of the contents.

Further, a poor sealing state is brought about in the case where the depth C of the groove 25a, 25b is out of the range of 0.05 mm to 1.0 mm. Specifically, a depth C of less than 0.05 mm coupled with misalignment between the overlap part R and the step 23 unavoidably causes application of an excessive pressure to the overlap part R. Also, a depth C in excess of 1.0 mm coupled with misalignment causes insufficient application of pressure to the overlap part R, not accomplishing good sealing state. However, as long as the width B is in the range from about 0.5 mm or more to about 1.5 mm or less, the depth C in excess of 1.0 mm, if coupled with misalignment between the overlap part R and the step 23, accomplishes a good sealing state.

When the distance D between the groove 25a, 25b and the step 23 is out of the range of 0 mm or more to about 1.5 mm or less, the area to which the ultrasonic vibrations are not transmitted is increased. Therefore, a good welding state cannot be accomplished, leading to the leakage of the contents. If the distance D is smaller than 0, it means that the step and the grooves are no longer formed separately. Accordingly, the advantageous effects of the present embodiment cannot be obtained.

(Operation)

The following description deals with operation of an ultrasonic sealing apparatus to which the anvil of the present embodiment is applied.

FIG. 7 is a cross-section view taken parallel to the Y-Z plane of the three-dimensional coordinates of FIG. 1 represented by the X, Y and Z axes. A long tubular material 9 is loaded on the ultrasonic sealing apparatus, and conveyed in the direction indicated by the arrow E in the figure by a conveyance mechanism, not shown. When it is so designed that the vertically downward direction corresponds to the conveyance direction of the tubular material 9, the tubular material 9 is permitted to move between the horn 5 and the anvil 7 without slackening due to gravity.

The horn 5 and the anvil 7 laterally approach the tubular material 9 conveyed in the downward direction to sandwich a sealing part S of the tubular material 9 for application of pressure and application of vibration at a frequency based on ultrasonic waves. The application of vibration allows the first PE resin 191 to melt, and the application of pressure allows the inner surfaces of the tubular material 9 to be sealed.

As shown in FIG. 7, the ultrasonic sealing apparatus is provided with the anvil 7. The anvil has a slit at the center thereof so that a cutting blade 71 can slidably pass through the slit and cut the tubular material 9. The horn is formed with a gap 51. After completing sealing, the cutting blade 71 moves towards the gap 51, and cuts the sealing part S. After cutting the sealing part S, a package is completed, with the upper part and the bottom part being sealed. Also, after cutting the sealing part S, a tubular material 9 is formed, with only the bottom part being sealed. Liquid contents are then filled in the tubular material 9.

The upper part of the tubular material 9 filled with the contents is sealed by the horn 5 and the anvil 7 in the same manner as stated above. The sealing part S is cut with the cooperation of the cutting blade 71 and the gap 51 to thereby complete a package.

The ultrasonic sealing apparatus may have two pairs of mechanisms each including the horn 5 and the anvil 7, so that the two pairs of mechanisms can alternately seal the upper part and the lower part of the tubular material 9 to manufacture packages at high speed.

According to the present embodiment, when the overlap part R is not misaligned with the step 23, a more optimal pressure can be applied to the overlap part R to seal the tubular material 9. The sealing part other than the overlap part R is applied with a sufficient pressure for sealing and supplied with a resin material as an adhesive to thereby seal the tubular material 9. According to the present embodiment, when the overlap part R is misaligned with the step 23, the step 23 and the groove 25a, 25b can better prevent application of an excessive pressure to the overlap part R, but allows application of a pressure necessary for sealing, with a supply of a resin material serving as an adhesive, to thereby seal the tubular material 9.

Specifically, according to the present embodiment, an optimal pressure can be applied for sealing in the absence of misalignment between the overlap part and the anvil, and can mitigate application of an excessive pressure in the occurrence of misalignment.

The present embodiment described above is not limited to the configuration discussed above. In the present embodiment, the step 23 has the bottom surface 233 parallel to the surface 17, and reversely tapered side surfaces 231 and 232. However, the present embodiment is not limited to this configuration.

FIG. 8 is a diagram illustrating another example of a step according to the present embodiment, that is, a cross-sectional view of another anvil 93 taken along the sealing direction. The anvil 93 has reversely tapered side surfaces 931 and 932 but does not have a bottom surface.

The anvil of the present embodiment is not limited to have a configuration where one groove 25a and one groove 25b are formed sandwiching the step 23. Alternatively, two or more groove 25a or 25b may be provided on each side. A plurality of grooves 25a or 25b may be provided according to the predicted misalignment amount of the overlap part, as long as the plurality of grooves are provided on each side of the step.

In the present embodiment, the distance between the step 23 and the groove 25a is equivalent to the distance between the step 23 and the other groove 25b. However, the present embodiment is not limited to this configuration. In the present embodiment, for example, when the misalignment amount of the overlap part R from the step 23 is biased towards either of the grooves 25a and 25b, the distance between the step 23 and the groove 25a, 25b may be determined according to the bias.

The drawings of the present embodiment described above are schematically illustrated. Therefore, the relationship between thickness and two-dimensional size of the components, and the thickness ratio between the layers may be inconsistent with the actual relationship or thickness ratio. Accordingly, the specific thickness and dimensional size should be recognized from the description. As a matter of course, dimensional relationship or ratio may be different between the drawings.

The present embodiment is only an example of a configuration for embodying the technical idea of the present invention, and thus the technical idea of the present invention should not be construed as specifying the materials, shapes, structures, arrangements, and the like of the components. The technical idea of the present invention can be modified in various ways within the technical scope defined by the claims.

As a matter of course, the present invention should encompass various embodiments and the like that are not described herein. Therefore, the technical scope of the present invention should be defined only by the matters defining the invention as recited in the claims which are understandable from the above description.

INDUSTRIAL APPLICABILITY

The present invention can be applied to any field as long as it involves an ultrasonic sealing anvil for sealing a packaging material having an overlap part.

REFERENCE SIGNS LIST

1 Ultrasonic oscillator; 3 Converter; 5 Horn; 7, 93 Anvil; 9 Tubular material; 17 Surface; 17' Phantom surface; 19 Packaging material; 23 Step; 25a, 25b Groove; 31 Edge protection tape; 51 Gap; 71 Cutting blade; 91a, 91b End part; 191 First PE resin; 192 Barrier material; 193 Second PE resin; 194 Paper; 195 Third PE resin; 231, 232, 931, 932 Side surface; 233 Bottom surface

What is claimed is:

1. An ultrasonic sealing anvil for sealing a packaging material having an overlap part extending in one direction, the sealing being performed in a sealing direction crossing the overlap part, wherein the anvil comprises:
 a) a phantom surface;
 b) a step on the phantom surface, the step can be abutted with the overlap part, the step comprises a bottom surface, a first side surface and a second side surface; and
 c) a first groove and a second groove on the phantom surface adjacent respectively to the first and the second side surface of the step in the sealing direction, wherein the bottom surface is parallel to the phantom surface, wherein the first side surface and the second side surface are tapered so that a length of the step at the phantom surface is greater than a length of the step of the bottom surface.

2. The ultrasonic sealing anvil of claim 1, wherein each of the first groove and the second groove has a width in a range of about 0.5 mm or more to about 1.5 mm or less.

3. The ultrasonic sealing anvil of claim 1, wherein each of the first groove and the second groove has a depth in a range of about 0.05 mm or more to about 1 mm or less.

4. The ultrasonic sealing anvil of claim 1, wherein each of the first groove and the second groove is formed being distanced from an end of the step adjacent to the respective groove by 0 mm or more to about 1.5 mm or less.

5. The ultrasonic sealing anvil of claim 1, wherein a cross-sectional shape of each of the first groove and the second groove in the sealing direction is different from a cross-sectional shape of the step in the sealing direction.

6. The ultrasonic sealing anvil of claim 1, wherein:
- the packaging material is elongated, and has an overlap part in which lateral opposite ends of the packaging material are overlapped with each other; and
- a relationship is established between a length T1 of the overlap part in the sealing direction and a length T2 of the bottom surface in the sealing direction, as expressed by $$T1 + x1 + x2 - 2t = T2$$

x1, x2: 0 or more to 1.5 mm or less
t: 0.5 mm or more to 5 mm or less
x1, x2: Misalignment amount between the step and the overlap part
t: Length from an end of the step to an end part of the bottom surface in the sealing direction.

* * * * *